(12) United States Patent
Kinoshita et al.

(10) Patent No.: US 6,346,687 B1
(45) Date of Patent: Feb. 12, 2002

(54) ENERGY BEAM PROCESSING METHOD AND PROCESSING APPARATUS THEREFOR

(75) Inventors: Makoto Kinoshita; Takeshi Kobayashi, both of Tottori (JP)

(73) Assignee: Ricoh Microelectronics Company, Ltd., Tottori (JP)

(*) Notice: Subject to any disclaimer, the term of this patent is extended or adjusted under 35 U.S.C. 154(b) by 0 days.

(21) Appl. No.: 09/252,201

(22) Filed: Feb. 18, 1999

(30) Foreign Application Priority Data

Feb. 19, 1998 (JP) .......................................... 10-056155
Nov. 16, 1998 (JP) .......................................... 10-325582
Feb. 12, 1999 (JP) .......................................... 11-034871

(51) Int. Cl.[7] .............................................. B23K 26/00
(52) U.S. Cl. ........................... 219/121.62; 219/121.61; 219/121.82
(58) Field of Search ...................... 219/121.61, 121.62, 219/121.85, 121.82, 121.31, 121.32; 318/632, 640

(56) References Cited

U.S. PATENT DOCUMENTS

| 4,568,815 A | | 2/1986 | Kimara et al. |
| 5,279,775 A | | 1/1994 | Thomas et al. |
| 5,313,403 A | * | 5/1994 | Fujita et al. |

FOREIGN PATENT DOCUMENTS

| JP | 60-231587 | * | 11/1985 | |
| JP | 61-242780 | * | 10/1986 | |
| JP | 62-94343 | * | 4/1987 | |
| JP | 63-295066 | * | 12/1988 | ............ 219/121.85 |
| JP | 1-142711 | * | 6/1989 | |
| JP | 8-17985 | * | 1/1996 | |
| WO | 88/08354 | * | 3/1988 | |

OTHER PUBLICATIONS

Patent Abstracts of Japan, vol. 17, No. 520, Sep. 20, 1993, JP 05 138374, Jun. 1, 1993.

* cited by examiner

*Primary Examiner*—Geoffrey S. Evans
(74) *Attorney, Agent, or Firm*—Oblon, Spivak, McClelland, Maier & Neustadt, P.C.

(57) ABSTRACT

An energy beam method and apparatus for processing a workpiece is accomplished by making the energy density per unit time and unit area of the energy beam proportional to the traveling velocity of the workpiece. This is accomplished by adjusting the frequency, irradiation power, or duty cycle of the energy beam. The travel velocity of the workpiece is measured by using a linear scale to generate pulse signals, calculating a traveling velocity based on the pulse signals and generating a pulse signal, dividing the pulse signals output by the calculation step, and generating a trigger signal in response to the pulse signals created by the dividing step to drive an energy beam irradiation device (such as a laser generator) to output the energy beam.

27 Claims, 7 Drawing Sheets

ENERGY BEAM PROCESSING METHOD AND PROCESSING APPARATUS THEREFOR

BACKGROUND OF THE INVENTION

1. Field of the Invention

The present invention relates to a processing method using an optical beam such as a laser beam and an energy beam such as of a charged particle, and a processing apparatus, utilizing the beam, more particularly, to a processing method for processing objects such as a resin, ceramic, metal and photolithographic photosensitive layer to drilling, half-etching, surface treatment and exposure to a photoresist using an energy beam such as a laser beam emitted from a $CO_2$ laser, YAG laser or excimer laser.

2. Description of the Related Art

The $CO_2$ laser (at infrared region of from 9 to 11 $\mu$m) and YAG laser (at near-infrared region of 1.064 $\mu$m) that are currently versatile for industrial application have been used mainly in cutting and welding of processing objects (workpiece or "work") because of their heat-melt capability. The processing method using such long-wavelength lasers is known as a heat-processing method taking advantage of heating induced by the laser beam.

Processing of the work using the excimer laser having a very short wavelength (193, 248, 308 and 351 nm) is classified as a non-heating processing for processing the work by taking advantage of a photochemical effect through a photochemical reaction induced by the laser beam, enabling to process the work with a superior processing accuracy to the heat-processing.

In the processing method using the excimer laser having such short wavelength, ceramics such silicon nitride, alumina, SiC and TiC, and synthetic resins such as polyimide, polyester, epoxy resin and polycarbonate are processed without melting with heat. In this method, intermolecular bonds are cleaved by exciting respective molecules in the polymer successively from the surface during the irradiation with the laser beam, which allows the molecules in a solid state to be scatter directly. This processing method is usually called an ablation processing, and makes it possible to achieve a more precise processing compared with the processing method using the $CO_2$ laser and YAG laser.

As a work processing method taking advantage of characteristics of such an excimer laser is a half-etching processing by which the surface of a relatively thick resin plate is drilled to a given depth. The half-etching processing using the excimer laser is utilized as a processing method for thinning the work at the minute hole portion of the printing mask in order for a paste such as a cream solder, or an ink for use in minute holes formed on the printing mask, to be readily discharged.

The laser beam emitted from the laser mentioned above is usually focused to have a beam spot shape of about 2 mm square on the processing surface of the work after passing through an aperture or a condenser. Therefore, the work to be processed by displacing relative to the laser beam when the length of an etching groove or the size of a hole to be formed on the work, or the length of a cutting or welding site of the work, is larger than the beam spot of the laser beam.

Accordingly, a table with an approximately horizontal mounting face for mounting the work is usually placed on a X-Y table which is capable of displacing of traveling the work mounting face along the X-Y directions. The X-Y table is provided so as to travel along the X-Y directions, to thereby for the work mounted on the mounting table to travel relative to the laser beam.

Figure 7:
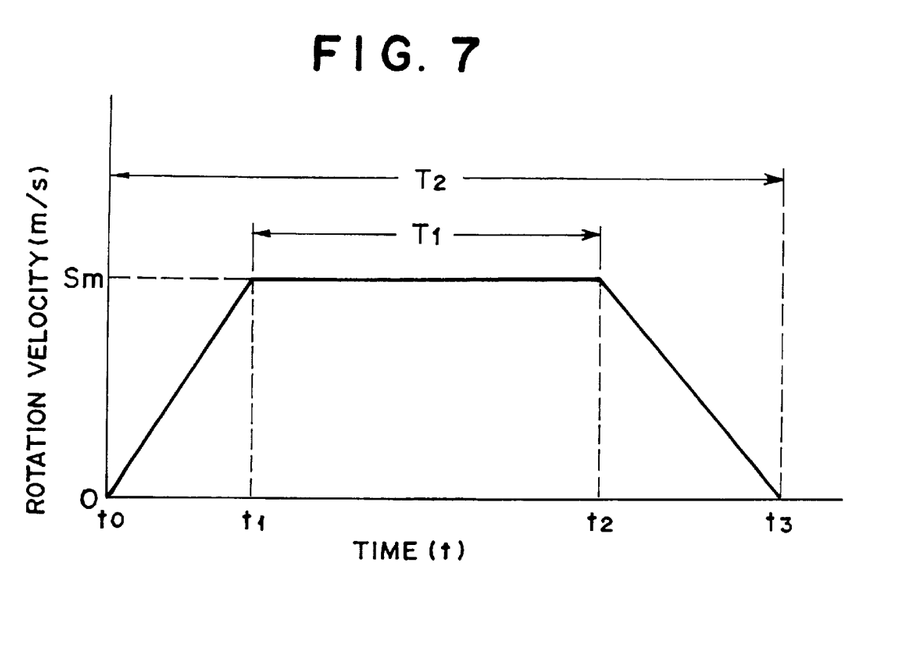
FIG. 7 includes a diagram illustrating the change of the rotational velocity with time, of the driving motor during the processing.

A driving motor such as a servomotor or a stepping motor is used for the driving source of the X-Y table equipped with the mounting table in the conventional processing apparatus using the aforementioned laser beam. It has been known that a rotational velocity of this driving motor is not immediately increased to a given speed Sm, but gradually accelerated for a period of time $t_1$ after a driving signal is outputted from the driving circuit at $t_0$ for initiating the rotation, as shown in FIG. 7. For halting the X-Y table, on the other hand, rotation of the driving motor is not allowed to stop instantaneously but has to be decelerated starting at $t_2$ from the given speed Sm, to finally stop the rotation at $t_3$.

Accordingly, the traveling velocity of the mounting table on the X-Y table driven with the driving motor is gradually accelerated, approximately by the same way as in the rotational velocity of the driving motor, during a time interval of from $t_0$ to $t_1$ after initiation of travel and is gradually decelerated during a time interval of from $t_2$ to $t_3$ before stopping in this processing apparatus.

Figure 8:
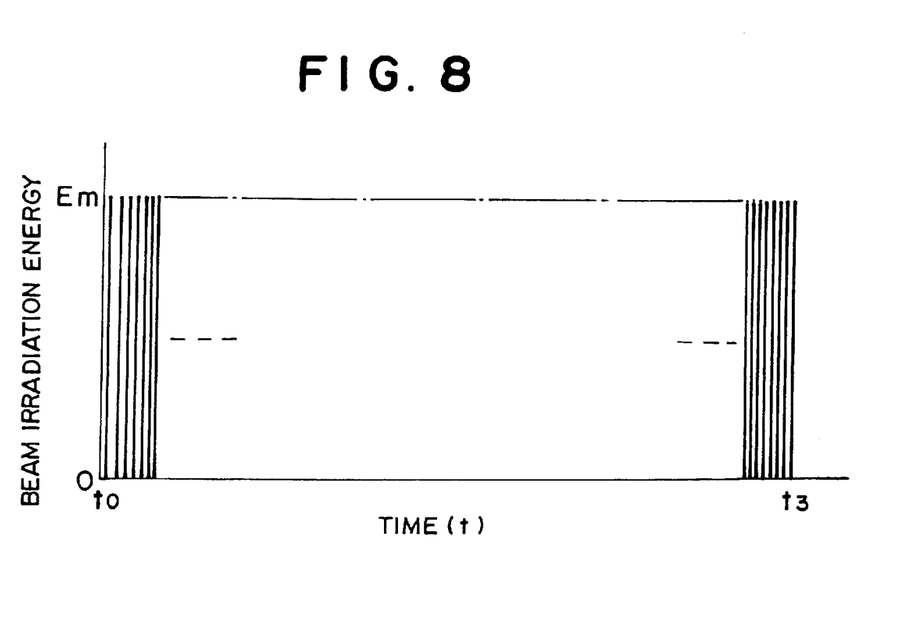
FIG. 8 illustrates the irradiation energy of the laser beam emitted from the laser with time in the processing apparatus.

However, as shown in FIG. 8, a pulse laser beam having an irradiation energy Em is immediately emitted from the laser by turning the laser driving circuit on to initiate the irradiation at to which is repeated in response to a trigger frequency given to the laser driving circuit. The laser beam having a constant pulse width, repeating frequency and irradiation energy Em is always emitted from the laser, without being increased or decreased in contrast to the driving motor described above, until the laser driving circuit is turned off at $t_3$ for ceasing the irradiation.

Accordingly, the laser beam irradiation density, per unit time and unit area on a beam irradiation surface of the work during the accelerating or decelerating travel period of the work, becomes larger than the beam irradiation density per unit time and unit area on the laser beam irradiation surface during the period at which the rotational velocity has reached to a given constant speed Sm in the processing method.

Figure 9A:
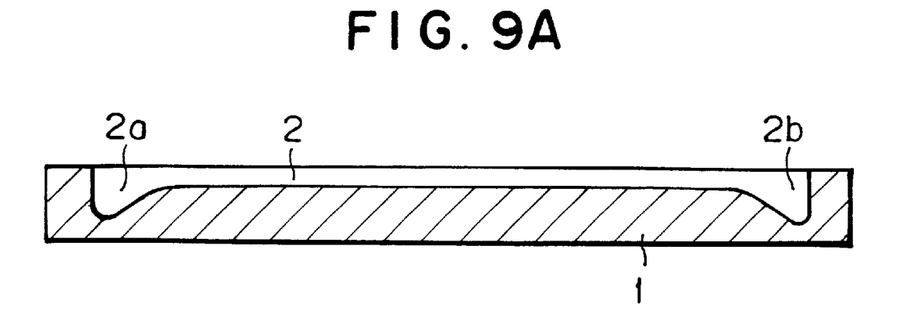
FIGS. 9A and 9B are cross sectional views of the work after being processed with a conventional processing apparatus.
Figure 9B:
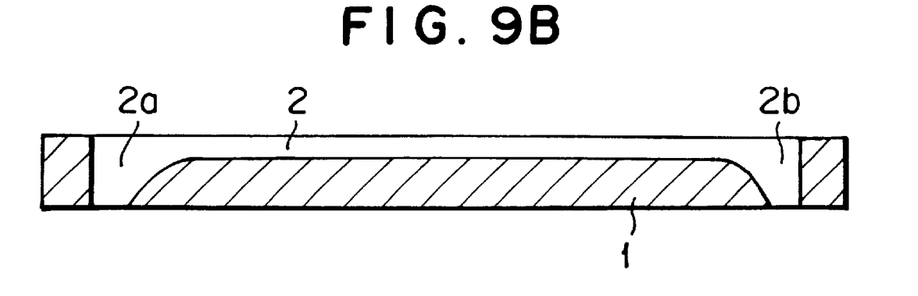

Consequently, the irradiation energy density per unit time and unit area of the laser beam irradiating at an initiation point 2a and a termination point 2b of the etching groove 2 (see FIGS. 9A and 9B) of the work 1 becomes larger than that irradiating the other portions. Therefore, when a half-etching processing with a given depth is to be applied on the work by using the excimer laser method, there is a drawback in that (1) the etching grooves at the processing initiation point 2a and processing termination point 2b of the etching groove 2 are formed deeper than the other portions, as shown in FIG. 9A, or (2) a hole is penetrated all through the depth of the work 1 at the processing initiation point 2a and termination point 2b of the etching groove 2, as shown in FIG. 9B.

Figure 9C:
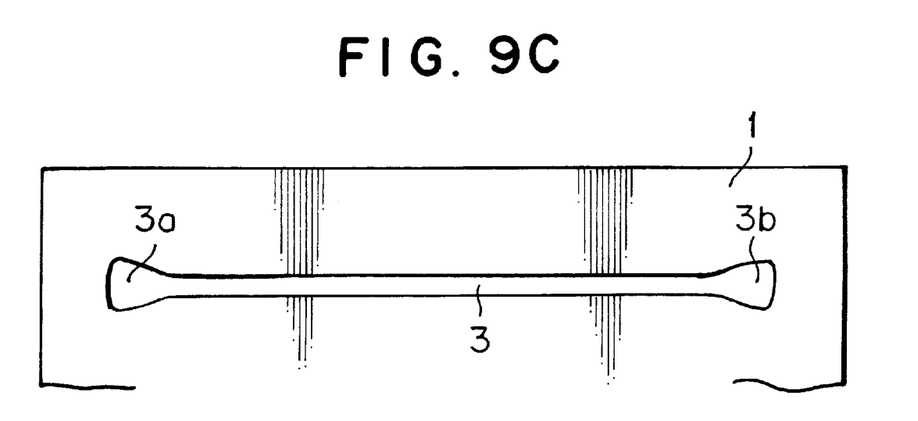
FIG. 9C is a top view of the work of FIGS. 9A and 9B.

When the work is to be cut off by the processing method using the $CO_2$ laser and YAG laser, the quantity to be melted of the work 1 at a cutting initiation point 3a or termination point 3b of the cut-off site 3 of the work 1 becomes larger than that of the other cutting portions as shown in FIG. 9C, thereby resulting an error in the dimension, as well as burning and sticking of the cut-off site 3 at the initiation point 3a and termination point 3b.

In order to obviate the aforementioned difficulties in the conventional processing method, the laser beam has been irradiated on the work merely within the time interval when rotation of the driving motor is stabilized by simply extending the overall driving time of the driving motor. In this case, the processing is started by initiating laser irradiation to the work with a timing later than the time t, when the rotational velocity of the driving motor has reached to a given speed Sm, and processing is completed by ceasing laser irradiation to the work with a timing prior to the time $t_2$ when the rotational velocity of the driving motor initiates to reduce the speed from the given speed Sm as shown in FIG. 7.

However, the overall driving time $T_2$ required for driving the driving motor largely exceed the maximum processing time $T_1$ required for stable processing of the work as shown in FIG. 7 in the processing method as described above, causing a difficulty in that the substantial processing time of the work is unduely prolonged.

In addition, the difficulties such as the aforementioned dimensional error at the travel initiation point and termination point or non-uniform processing, or the substantially prolonged processing time may be caused by the laser beam irradiated only within the time interval when rotation of the driving motor has been stabilized. This may be encountered not only in the processing method and processing apparatus using the laser beam, but also in those using energy beams such as a light beam, x-ray beam and charged particle beam by which the degree of processing is changed depending on the energy density (area density) per unit time and per unit area of the irradiated beam.

Also, the above-mentioned difficulties may occur not only when the work is processed by allowing it to travel, but also when the work is processed by allowing the energy beam such as the laser beam to travel or when the work is processed by allowing the work and the energy beam to travel along different directions, respectively, crossing with each other.

SUMMARY OF THE INVENTION

Accordingly, the object of the present invention is to provide a processing method and processing apparatus therefor that allows a uniform processing with high accurate without prolonging the processing time.

In one aspect, the present invention provides a processing method by which a processing object is processed by being allowed to travel relative to an energy beam for irradiating the processing object, wherein the relative traveling velocity is made proportional to the irradiation energy density per unit time and unit area of the energy beam on the processing object.

The traveling velocity of the processing object relative to the energy beam is adjusted to be proportional to the irradiation energy density per unit time and unit area of the energy beam on the processing object in the processing method as described above. Therefore, the irradiation energy density on the energy irradiation surface of the processing object within an accelerating region and decelerating region during the relative movement is equalized with the irradiation energy density on the energy irradiation surface of the processing object within the region where the relative traveling velocity has reached to a given constant speed, thereby allowing the irradiation energy density of the energy beam for irradiating the processing surface of the processing object to be uniform throughout the processing surface.

Also, the present invention provides a processing method by which the processing object is processed by being irradiated with an energy beam whose irradiation path is fixed relative to the traveling processing object, wherein the traveling velocity of the processing object relative to the energy beam is made proportional to the irradiation energy density per unit time and unit area of the energy beam on the processing object.

The traveling velocity of the processing object is adjusted to be proportional to the irradiation energy density per unit time and unit area of the energy beam on the processing object in the processing method as described above. Therefore, the irradiation energy density on the energy irradiation surface of the processing object within the accelerating region and decelerating region of the processing object is equalized with the irradiation energy density on the energy irradiation surface of the processing object within the region where the relative traveling velocity has reached to a given constant speed, thereby allowing the irradiation energy density of the energy beam for irradiating the processing surface of the processing object to be uniform throughout the processing surface.

Also, the present invention provides a processing method by which the processing object is processed by allowing the energy beam to travel relative to a fixed processing object, wherein the traveling velocity of the processing object relative to the energy beam is made proportional to the irradiation energy density per unit time and unit area of the energy beam on the processing object The traveling velocity of the energy beam is adjusted to be proportional to the irradiation energy density per unit time and unit area of the energy beam on the processing object in the processing method as described above. Therefore, the irradiation energy density on the energy irradiation surface of the processing object within the accelerating region and decelerating region of the energy beam is equalized with the irradiation energy density on the energy irradiation surface of the processing object within the region where the relative traveling velocity of the energy beam has reached to a given constant speed, thereby allowing the irradiation energy density of the energy beam for irradiating the processing surface of the processing object to be uniform throughout the processing surface.

Also, the present invention provides a processing method by which the processing object is processed by being allowed to travel along one direction of the two mutually orthogonal directions, along with allowing the energy beam for irradiating the processing object to travel along the other direction of the two directions, wherein the traveling velocity of the processing object relative to the energy beam is made to be proportional to the irradiation energy density per unit time and unit area of the energy beam on the processing object.

The traveling velocity of the processing object relative to the energy beam is adjusted to be proportional to the irradiation energy density per unit time and unit area of the energy beam on the processing object in the processing method as described above. Therefore, the irradiation energy density on the energy irradiation surface of the processing object within the accelerating region and decelerating region of the relative traveling is equalized with the irradiation energy density on the energy irradiation surface of the processing object within the region where the relative traveling velocity has reached to a given constant speed, thereby allowing the irradiation energy density of the energy beam for irradiating the processing surface of the processing object to be uniform throughout the processing surface.

Also, the present invention provides a processing method in which the energy beam is a pulse energy beam having a given pulse width repeatedly irradiating the processing object, wherein the relative traveling velocity is made to be proportional to the repeating frequency of the energy beam.

The relative traveling velocity is adjusted to be proportional to the irradiation energy density per unit time and unit area of the energy beam on the processing object by allowing the relative traveling velocity to be proportional to the repeating frequency of the pulse energy beam having a given pulse width repeatedly irradiating the processing object in the processing method as described above.

Also, the present invention provides a processing method in which the energy beam is a pulse energy beam for repeatedly irradiating the processing object with a given repeating frequency, wherein the relative traveling velocity is made to be proportional to the pulse width of the energy beam.

The relative traveling velocity is adjusted to be proportional to the irradiation energy density per unit time and unit area of the energy beam on the processing object by allowing the relative traveling velocity to be proportional to the pulse width of the pulse energy beam repeatedly irradiating the processing object with a given repeating frequency in the processing method as described above.

The relative traveling velocity is preferably made to be proportional to the irradiation power of the energy beam in the processing method according to the present invention.

The relative traveling velocity is adjusted to be proportional to the irradiation energy density per unit time and unit area of the energy beam on the processing object by allowing the relative traveling velocity to be proportional to the irradiation power of the energy beam in the processing method as described above.

The energy beam is preferably a laser beam in the processing method according to the present invention.

The relative traveling velocity is adjusted to be proportional to the irradiation energy density per unit time and unit volume of the laser beam on the processing object in the processing method as described above.

In another aspect, the present invention provides a processing apparatus provided with processing object driving means for allowing a processing object to travel and an energy beam irradiation device for irradiating the energy beam on the processing surface of the processing object that is allowed to travel by the processing object driving means, wherein irradiation control means for controlling the energy beam irradiation device is provided so that the traveling velocity of the processing object relative to the energy beam is made to be proportional to the irradiation energy density per unit time and unit area of the energy beam on the processing object.

The traveling velocity of the processing object relative to the energy beam is adjusted to be proportional to the irradiation energy density per unit time and unit volume of the energy beam on the processing object by controlling the energy beam irradiation device with the irradiation control means in the processing apparatus as described above. Therefore, the energy density on the energy irradiation surface of the processing object within the acceleration region and deceleration region of the relative traveling is equalized with the irradiation energy density on the energy beam irradiation surface of the processing subject within the region where the relative traveling has reached to a given velocity, thereby allowing the irradiation energy density of the energy beam irradiating the processing surface of the processing object to be uniform throughout the processing surface.

In still another aspect of the present invention, a processing apparatus is provided with an energy beam irradiation device for irradiating the energy beam on the processing surface of the processing object and beam traveling means for allowing the energy beam to travel relative to the processing object, wherein an irradiation control means for controlling the energy beam irradiation device is provided so that the traveling velocity of the processing object relative to the energy beam is made to be proportional to the irradiation energy density per unit time and unit area of the energy beam on the processing object.

The traveling velocity of the processing object relative to the energy beam is made to be proportional to the irradiation energy density per unit time and unit area of the energy beam on the processing object in the processing device as described above. Therefore, the irradiation energy density per unit time and unit area of the energy beam on the processing object within accelerating and decelerating regions of the relative traveling is equalized with the irradiation energy density on the beam irradiation surface of the processing object within the region where the relative traveling has reached to a given velocity, thereby allowing the irradiation energy density of the energy beam irradiating the processing surface of the processing object to be uniform throughout the processing surface.

In yet another aspect of the invention, a processing apparatus is provided with processing object driving means for allowing the processing object to travel along one direction of mutually orthogonal two directions, an energy beam irradiation device for irradiating an energy beam on the processing surface of the processing object, and beam traveling means for allowing the energy beam to travel along the other direction of the two directions, wherein an irradiation control means for controlling at least one of the driving means and the energy beam irradiation device is provided so that the traveling velocity of the processing object relative to the energy beam is made to be proportional to the irradiation energy density per unit time and unit area of the energy beam on the processing object.

The traveling velocity of the processing object relative to the energy beam is adjusted to be proportional to the irradiation energy density per unit time and unit volume of the energy beam on the processing object in the processing apparatus as described above. Therefore, the irradiation energy density on the energy irradiation surface of the processing object within acceleration and deceleration regions of the relative traveling is equalized with the irradiation energy density on the irradiation surface of the processing object within the region where the relative traveling has reached to a given constant velocity, thereby allowing the irradiation energy density of the energy beam irradiating the processing surface of the processing object to be uniform throughout the processing surface.

Also, the present invention provides a processing apparatus using a device for repeatedly irradiating a pulse energy beam having a given pulse width on the processing object as the energy beam irradiation device, wherein the energy beam irradiation device is controlled so that the relative traveling velocity is made to be proportional to the repeating frequency of the energy beam.

The relative traveling velocity is adjusted to be proportional to the irradiation energy density per unit time and unit volume of the energy beam on the processing object by controlling the energy beam irradiation device for repeatedly irradiating the pulse energy beam having a given pulse width on the processing object with the irradiation control means so that the relative traveling velocity is made to be proportional to the repeating frequency of the energy beam in the processing apparatus as described above.

Also, the present invention provides a processing apparatus in which the irradiation control mean comprises synchronizing signal generation means for generating a synchronizing signal with a frequency proportional to the relative traveling velocity and trigger generation means that generates a driving trigger for driving the energy beam irradiation device in response to the synchronizing signal outputted from the synchronizing signal generation means at a frequency proportional to the relative traveling velocity.

The synchronizing signals with a frequency proportional to the relative traveling velocity is generated with the synchronizing signal generation means and the driving trigger with a frequency proportional to the relative traveling velocity is generated with the trigger generation means in response to the synchronizing signal in the processing apparatus as described above. Driving the energy beam irradiation device based on this driving trigger allows the relative traveling velocity to be proportional to the repeating frequency of the energy beam, thereby adjusting the relative traveling velocity to be proportional to the irradiation energy density per unit time and unit volume of the energy beam on the processing object.

Also, the present invention provides a processing apparatus provided with the processing object driving means constructed using a mounting table for mounting the processing object and a driving motor for allowing the mounting table along a given direction, wherein the irradiation control means is constructed using the synchronizing signal generation means for generating a synchronizing signal with a frequency proportional to the rotational velocity of the driving motor or the traveling velocity of the mounting table and the trigger generation means that generates the driving trigger for driving the energy beam irradiation device at a frequency proportional to the rotational velocity or to the traveling velocity in response to the synchronizing signal outputted from the synchronizing signal generation means.

The synchronizing signal with a frequency proportional to the rotational velocity of the driving motor or to the traveling velocity of the mounting table is generated with the synchronizing signal generation means and the driving trigger with a frequency proportional to the rotational velocity or traveling velocity is generated with the trigger generation means in response to the synchronizing signal in the processing apparatus as described above. Driving the energy beam irradiation device based on this driving trigger allows the rotational velocity of the driving motor or the traveling velocity of the mounting table to be proportional to the repeating frequency of the energy beam. Therefore, the traveling velocity of the processing object is allowed to be proportional to the repeating frequency of the energy beam, thereby allowing the traveling velocity of the processing object to be proportional to the irradiation energy density per unit time and unit area of the energy beam on the processing object.

Also, the present invention provides a processing apparatus using an encoder for generating pulse signals for given respective rotation angles of the driving motor, or a linear scale for generating pulse signals for given respective travel positions of the processing object as the synchronizing signal generation means.

The pulse signals for given respective rotation angles of the driving motor or corresponding to given respective travel positions of the processing object are generated as the synchronizing signals in the processing apparatus as described above. The trigger signal with a frequency proportional to the traveling velocity of the processing object is generated in response to the pulse signal from the linear scale.

The trigger generation means is preferably provided with a dividing circuit for dividing the synchronizing signal in the processing apparatus according to the present invention.

Dividing the synchronizing signal with the dividing circuit provided in the trigger generation means allows the driving trigger frequency for driving the energy beam irradiation device to be changed, thereby adjusting the irradiation energy density for irradiating the processing object.

Also, the present invention provides a processing apparatus using an irradiation means for repeatedly irradiating the pulse energy beam on the processing object at a repeating frequency as the energy beam irradiation device, wherein the energy beam irradiation device is controlled so that the relative traveling velocity is made to be proportional to the pulse width of the energy beam.

The relative traveling velocity is adjusted to be proportional to the irradiation energy density per unit time and unit area of the energy beam on the processing object by controlling the energy beam irradiation device that irradiates the pulse energy beam on the processing object at a given repeating frequency with the irradiation control means to allow the relative traveling velocity to be proportional to the pulse width of the energy beam in the processing apparatus as described above.

The energy beam irradiation device is preferably controlled so that the relative traveling velocity is made to be proportional to irradiation power of the energy beam.

The relative traveling velocity is adjusted to be proportional to the irradiation energy density per unit time and unit area of the energy beam on the processing object by controlling the energy beam irradiation device with the irradiation control means to allow the relative traveling velocity to be proportional to the irradiation power of the energy beam in the processing apparatus as described above.

It is preferable that the energy beam is a laser beam in the processing apparatus according to the present invention.

The relative traveling velocity is adjusted to be proportional to the irradiation energy density per unit time and unit area of the laser beam on the processing object in the processing apparatus as described above.

DESCRIPTION OF THE PREFERRED EMBODIMENTS

The preferred embodiments in which the present invention is applied to processes such as half-etching and drilling processing on a workpiece or "work" using a $CO_2$ laser and YAG laser will be described hereinbelow.

Figure 1:
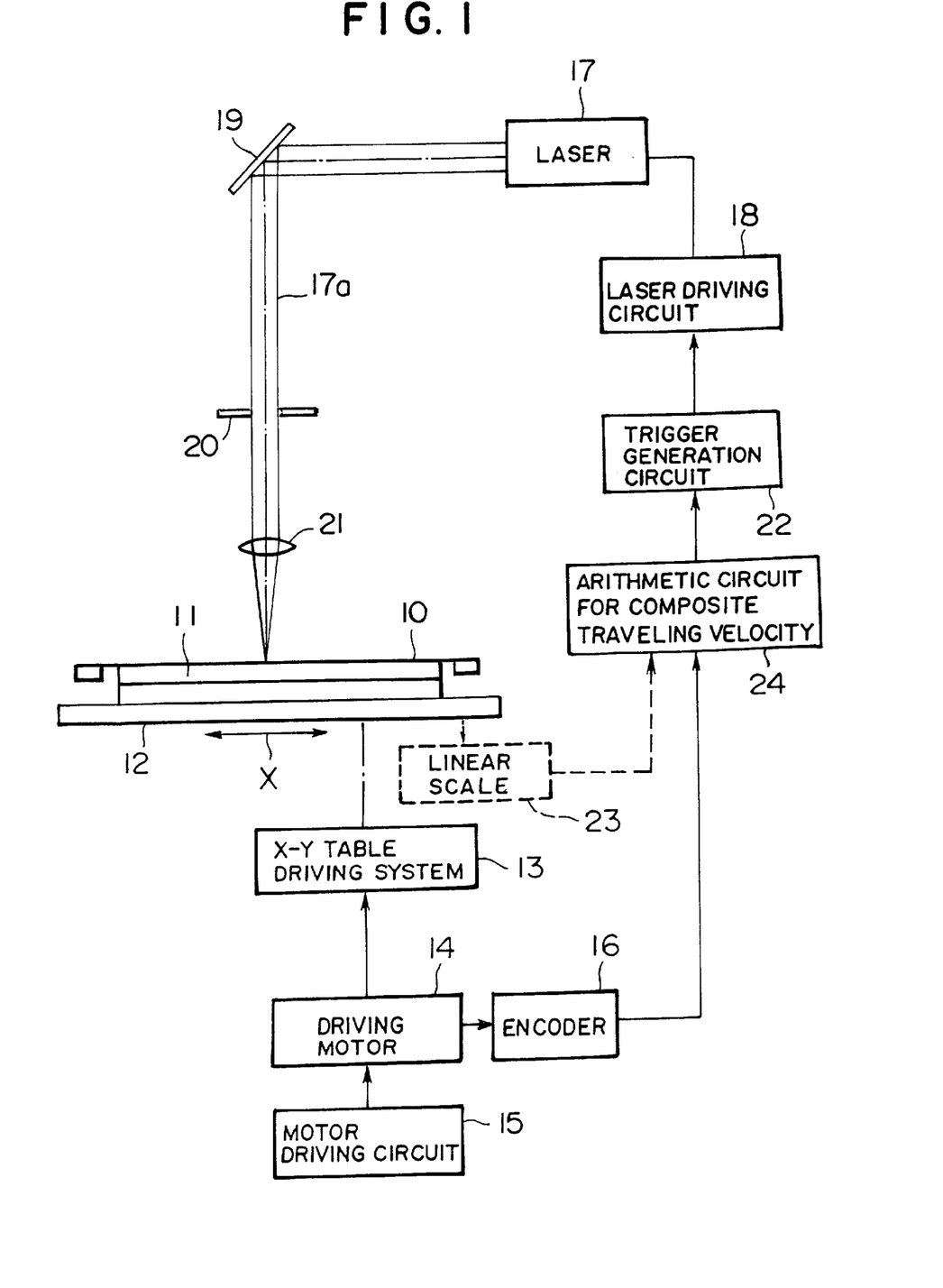
FIG. 1 includes a diagram illustrating the processing apparatus according to the present invention.

FIG. 1 includes a block diagram illustrating an overall construction a processing apparatus for manufacturing a plastic mask for printing by drilling minute holes on a work comprising a plastic plate with a laser beam. In FIG. 1, the work 10 is mounted on a mounting table 11 having an approximately horizontal mounting face. The mounting table 11 is placed on a X-Y table 12 that can travel the mounting face along the X-direction (the horizontal direction in FIG. 1) and along the Y-direction crossing at a right angle with the X-direction (the direction perpendicular to the drawing in FIG. 1). The X-Y table 12 is driven along the X- and Y-directions with a driving motor 14 driven by a X-Y table driving system 13. The driving motor 14 is driven with a motor driving circuit 15 for supplying driving power to the driving motor 14 in response to driving instructions from a drive control device (not shown). The driving means for driving the work 10 thus include the mounting table 11, X-Y table 12, X-Y table driving system 13 and driving motor 14.

A linear servomotor capable of feedback control was used for the driving motor 14. A linear encoder 16 is attached to the driving motor 14 to serve as a synchronizing signal generation means for generating pulse signals with a frequency proportional to the traveling velocity of the movable part of the motor. The signal outputted from the linear encoder 16 is used for drive control of a laser to be described hereinafter together with feedback control of the driving motor 14.

When a conventional servomotor is used for the driving motor 14, an optical encoder that generates synchronized signals (or pulses) proportional to the rotational velocity of the driving motor 14 can be used in which a transmitted light from a slit on a disk rotating in synchronous with rotation of the driving motor 14 or a reflected light from a sensing mark printed on the disk is detected with a photosensor, or magnetic lines from a magnetic pole magnetized on the disk is sensed with a known magnetic sensor.

The laser 17 for emitting a pulse laser beam as an energy beam emits a laser beam 17a by being actuated with a laser drive circuit 18 for driving the laser 17 in response to a driving trigger with a given frequency (usually 200 Hz for the excimer laser). An energy beam irradiation device is thus composed of the laser 17 and the laser drive circuit 18. When the laser 17 is a YAG laser, a Q-switch is used for the laser drive circuit 18.

The laser beam 17a emitted from the laser 17 irradiates the processing surface of the work 10 to be processed through (1) a reflector 19 for allowing the irradiating light of the laser beam 17a to be directed so that the laser beam 17a is projected approximately perpendicular to the processing surface of the work 10, (2) an aperture 20 for limiting the shape of the transmitted laser beam 17a so that the shape of the bean spot of the laser beam 17a be conformed to a processing shape on the work 10, and (3) a condenser 21 for focusing the laser beam 17a after passing through the aperture 20 onto the processing surface of the work 10 to form an approximately 2 mm square spot, for example.

The laser 17 is usually constructed so that pulses of the laser beam 17a with a given repeating frequency are emitted by being actuated with the laser driving circuit 18 in response to a driving trigger having a given frequency (for example, at 200 Hz). When the work 10 is processed using the laser beam 17a having such a given repeating frequency, the irradiation energy density per unit time and unit area of the laser beam on the beam irradiation surface of the work within the aforementioned accelerating or decelerating region of the work 10 becomes larger than the irradiation energy density within the region where the rotational velocity of the driving motor 14 has reached to a given constant speed Sm. Consequently, etched grooves close to the processing starting point or end point of the etching groove on the work 10 are formed deeper or a hole is penetrated as illustrated in FIGS. 9A and 9B, although a half-etching processing with a given depth is originally attempted to apply on the work 10.

Further, a multiple irradiation of the laser beam may occur especially when a stepping motor is used for the driving motor 14, to thereby causing troubles in that the work is melted or the hole is drilled too deep, because the X-Y table 12 is momentarily stopped when the motor is out of the tuning.

Accordingly, in one embodiment of the present invention, a trigger generation circuit 22 as a trigger generating means that generates a driving trigger in response to the synchronizing signal (pulse signal) outputted from the linear encoder 16 as a synchronizing signal generating means is provided so that the laser 17 is able to be actuated at a repeating frequency proportional to the traveling velocity of the movable part of the driving motor (linear servomotor) in the processing apparatus. The processing apparatus is then constructed to input the driving trigger outputted from the trigger generation circuit 22 to the external trigger input terminal of the laser driving circuit la.

Figure 2:
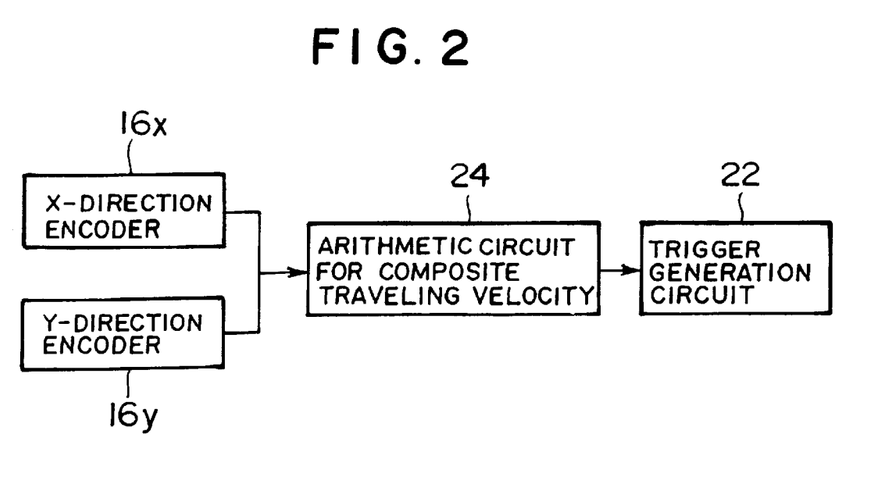
FIG. 2 includes a block diagram illustrating a part of the laser control system of the processing apparatus of FIG.1.

The driving motors 14x and 14y, and the linear encoders 16x and 16y are provided on respective travel axes orthogonal with each other in this processing apparatus, so as to allow a two-dimensional movement of the work 10 on the mounting table 11 of the X-Y table 12. Accordingly, an arithmetic circuit 24 is provided as shown in FIG. 2 for calculating the composite traveling velocity in response to the output pulse signal transferred from the linear encoders 16x and 16y along the X- and Y-directions, respectively, to output pulse signals corresponding to the composite traveling velocity.

The laser 17 is actuated in response to the driving trigger generated from the trigger generation circuit 22, or in response to the driving trigger varying in response to the repeating frequency (cycle) being proportional to the composite traveling velocity of the movable part of the driving motor 14, at least within the region where the composite traveling velocity of the mounting table 11 is changed during processing of the work 10, or within the accelerating travel region of the work 10 after the driving motor 14 has started to drive, and at least within the decelerating travel region of the work 10 after the driving motor 14 has started to decelerate.

The composite traveling velocity of the mounting table 11 on the X-Y table 12 driven with the drive motor 14 is adjusted to be proportional to the repeating frequency of the pulse laser beam 17a emitted from the laser 17 in the processing apparatus having such construction as described above. Accordingly, the irradiation energy density per unit time and unit area of the laser beam 17a on the laser beam irradiation surface of the work 10 within the accelerating travel region and decelerating travel region of the work 10 may be equalized with the irradiation energy density per unit time and unit area of the laser beam 17a on the laser beam irradiation surface of the work 10 within the area where the rotational velocity of the driving motor 14 has reached at a given speed Sm in this processing apparatus.

Figure 3:
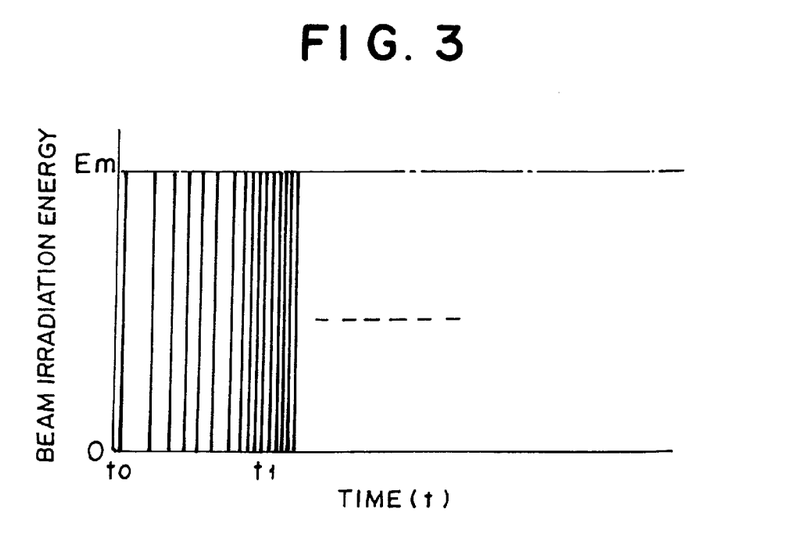
FIG. 3 illustrates the irradiation energy of a laser beam emitted from the laser with time in the processing apparatus.

Namely, the beam shot number of the laser 17a is made to be proportional to the composite traveling velocity of the movable part of the driving motor 14, or to the composite traveling velocity of the work 10. Therefore, the beam shot number of the laser beam 17a within the accelerating travel region and decelerating travel region (not shown) of the work 10 is gradually increased or decreased in proportion to the composite traveling velocity of the work 10 as shown in FIG. 3. Accordingly, the irradiation energy density per unit time and unit area of the laser beam 17a on the laser beam irradiation surface of the work 10 within the accelerating travel region and decelerating travel region of the work 10 is equalized with the laser beam 17a on the laser beam irradiation surface of the work 10 within the area where the composite traveling velocity of the work 10 has reached a given speed Sm, thereby obviating the aforementioned difficulties.

According to the present embodiment, the irradiation energy density per unit time and unit area of the laser beam 17a irradiating the processing surface of the work 10 is made uniform throughout the processing surface, enabling a uniform processing with high dimensional accuracy. In addition, the irradiation energy density is equalized even when the traveling velocity of the work 10 is changing as at the travel initiation time of the work 10 to enable uniform processing with high dimensional accuracy, thereby avoiding prolonged processing time of the work 10.

According to the present embodiment, the etching grooves at the starting point and ending point of the processing are neither drilled deeper than the other sites nor holes are penetrated through at the starting point and ending point of the processing. Also, other difficulties such that the dimensional accuracy is decreased, or burning and sticking are generated at the starting point and ending point of cutting can be avoided, because the degree of melting of the work at the starting point and ending point of cutting is made to be equal to the degree of melting of the other portions of the work which is subjected to cutting using the $CO_2$ laser or YAG laser.

Figure 4:
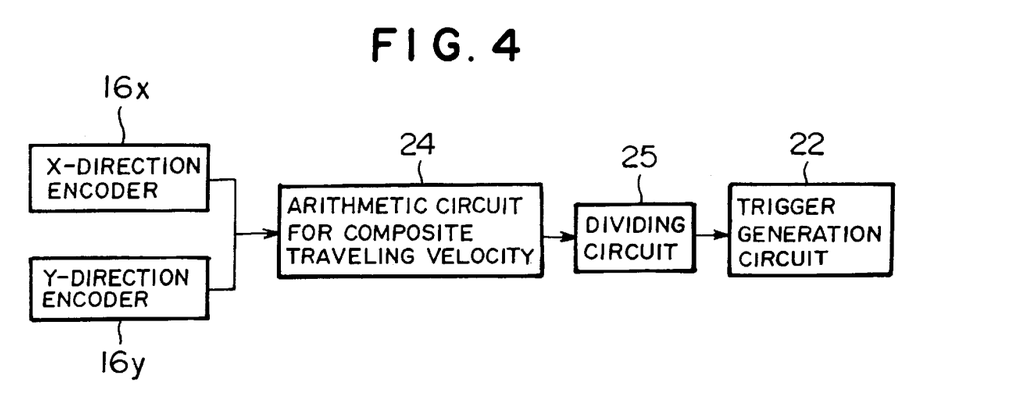
FIG. 4 includes a block diagram showing a part of the laser control system of the processing apparatus of FIG. 1 according to another embodiment.
Figure 5:
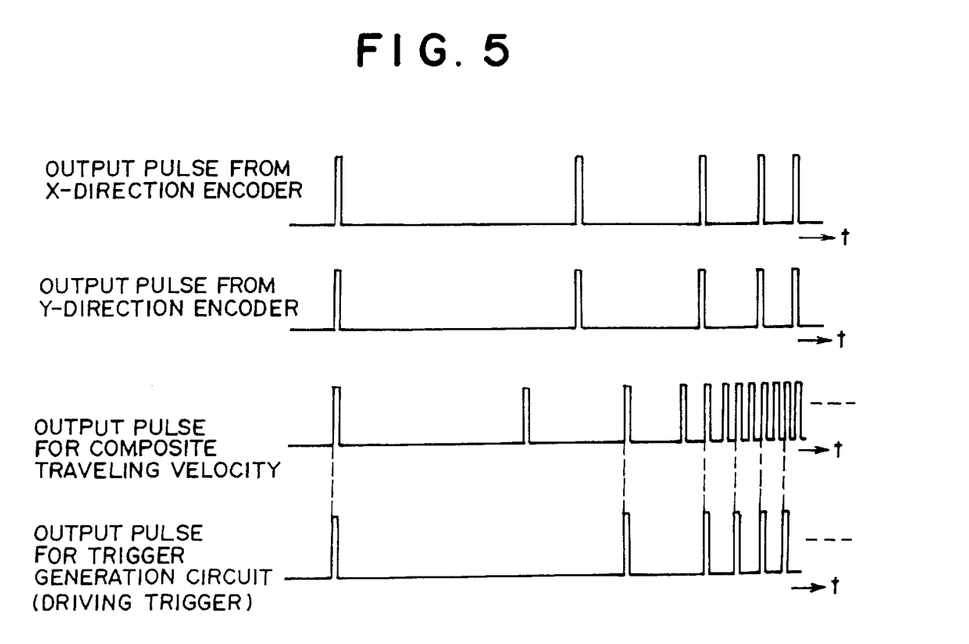
FIG. 5 illustrates timing for each output pulse signal in the laser control system of FIG.1.

While the arithmetic circuit 24 for calculating the composite traveling velocity is designed to directly output pulse signals to the trigger generation circuit 22 in the present embodiment, a dividing circuit 25 for dividing the output signal from the arithmetic circuit 24 for calculating the composite traveling velocity may alternatively be provided between the arithmetic circuit 24 and trigger generation circuit 22 (FIG. 4). In that construction, the driving trigger (FIG. 5) being proportional to the frequency of the output pulse signal of the linear scale 23 can be directly generated within a frequency region suitable for the laser driving circuit 16 without using a conversion table or conversion equation, when the output signal corresponding to the composite traveling velocity is divided with the dividing circuit 25. In addition, the irradiation energy density of the laser beam irradiating on the work 10 can be directly changed by varying the dividing ratio from the dividing circuit 25.

Figure 6A:
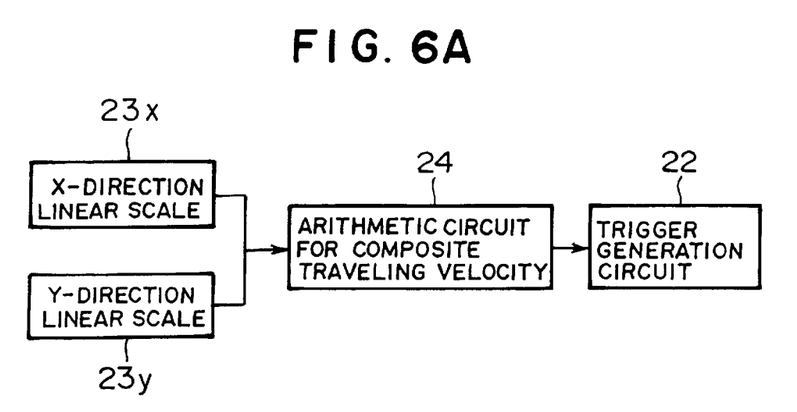
FIG. 6A and FIG. 6B denote a part of the laser control systems of the processing apparatus according to still another embodiment.

In the present embodiment, the laser 17 is actuated with the driving trigger generated from the trigger generation circuit 22, or with the driving trigger repeating at a frequency proportional to the composite traveling velocity of the movable part of the driving motors 14x and 14y, within the accelerating travel region of the work 10 after the driving motor 14 has started to drive and within the decelerating travel region after the driving motor 14 has started to decelerate by sending the synchronizing signal (output pulse signal) transmitted from the linear encoder 16 to the trigger generation circuit 22. However, a linear scale 23 (23x and 23y) for generating pulse signals for each given travel site along the X- or Y-direction of the work 10 may be provided as indicated by the broken lines in FIG. 1. This linear scales 23z and 23y are provided on the mounting table 11 or on the X-Y table 12, and the output pulse signals thereof are outputted to the trigger generation circuit 22 via the arithmetic circuit 24 for calculating the composite traveling velocity (FIG. 6A).

With the construction described just above, the composite traveling velocity is calculated with the arithmetic circuit 24 for calculating the composite traveling velocity in response to the output pulse signals from respective linear scales 23x and 23y, generating the output pulse signals with a frequency being matched to the composite traveling velocity. This output signal may be controlled so as to determine the repeating frequency of the driving trigger in response to the frequency and a conversion table or conversion equation after determining the frequency of the output pulse signal of the arithmetic circuit 24 for calculating the composite traveling velocity, so that the trigger generation circuit 22 generates the driving trigger for actuating the laser 17 at a frequency that matches to the composite traveling velocity of the work 10.

Figure 6B:
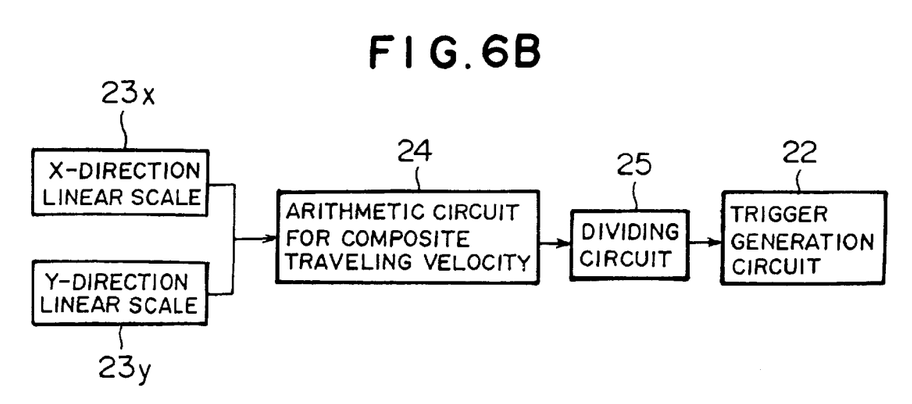

The dividing circuit 25 for dividing the output pulse signal from the arithmetic circuit 24 for calculating the composite traveling velocity may be provided between the arithmetic circuit 24 and the trigger generation circuit 22 as shown in FIG. 6B when the linear scales 23 (23x and 23y) are used. With this construction, a driving trigger proportional to the frequency of output pulse signal of the arithmetic circuit 24 for calculating the composite traveling velocity may be directly generated within the frequency region suitable for the laser driving circuit 18 without using the conversion table or the conversion equation. Further, the irradiation energy density of the laser beam irradiating on the work 10 may be changed by adjusting the dividing ratio in the dividing circuit 26.

Although the linear servomotor is used for the driving motor 14 in the present embodiment, the present invention may also be applied in the construction in which the X-Y table is driven by combining a conventional rotatively driven servomotor as the driving motor 14 with ball screws.

A conventional rotatively driven stepping motor or a linear stepping motor may also be used as the driving motor 14. While the driving trigger outputted from the trigger generation circuit 22 may become unstable when a feedback control servomotor is used since the X-Y table may undergo a slight reciprocating motion when its rotational velocity or traveling velocity has reached at a constant speed Sm, a stable trigger can be generated even at a the constant speed Sm when a stepping motor without being subjected to the feedback control is used.

Although a beam from the $CO_2$ laser, YAG laser or excimer laser is used as an energy beam, and a half-etching processing and drilling processing are carried out on the work including a resin plate as a processing object in the present embodiment, applications of the present invention is not limited to such processes. For example, the present invention can be applied to processes using energy beams other than the laser beam, such as a light beam or a charged particle beam. Also, the present invention can be applied not only for the half-etching or drilling processing but also applied to the surface treatment of a resin, ceramic, metal and sensitized layer for lithography, or for exposure on a photoresist.

Although the pulse laser beam having a given pulse width that repeatedly irradiates the work 10 is used as an energy beam to allow the traveling velocity of the work 10 to be proportional to the repeating frequency of the laser beam in the present embodiment, the pulse laser beam for repeatedly irradiating the work 10 with a given repeating frequency may also be used as the energy beam to allow the traveling velocity of the work 10 to be proportional to the repeating frequency of the laser beam.

Also, the traveling velocity of the work 10 may be made to be proportional to the laser output power.

While the work 10 as a processing object is allowed to travel relative to the laser beam whose light path is fixed in the present embodiment, the present invention is also applicable for the case where (1) the work is fixed and the laser beam irradiates the work while allowing the laser beam to travel relative to the work or (2) the work is allowed to travel along the X-direction with irradiating the laser beam which is allowed to travel along the Y-direction.

Figure 10:
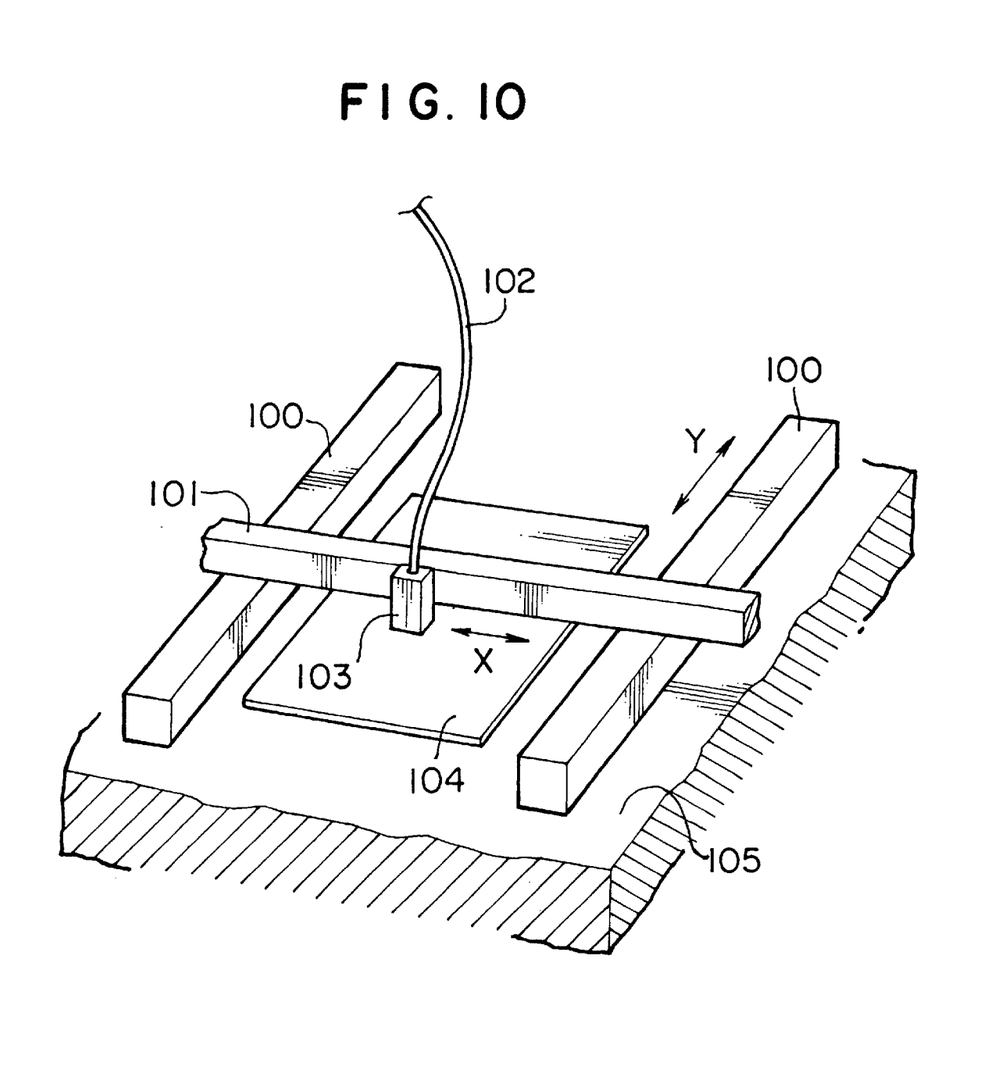
FIG. 10 is a perspective view of the laser beam traveling mechanism of the processing apparatus according to another embodiment.

FIG. 10 shows an illustrative perspective view of the laser beam traveling mechanism in the processing apparatus in which the work is fixed and the laser beam emitted from the laser source is guided to the vicinity of the work by using an optical fiber. This laser beam traveling mechanism is constructed using a pair of Y-direction movable members 100 driven along the Y-direction in the drawing with a Y-direction driving device (not shown), and a X-direction movable members 101 driven along the X-direction in the drawing crossing at right angle with the Y-direction with a X-direction driving device (not shown) on the Y-direction movable members 100. A light projection end of the optical fiber 102 is fixed with a fixing member 103 at near the center of the X-direction movable members 101. An image-forming optical system is provided in the vicinity of the light projection end of the optical fiber 102, allowing the laser beam to be projected on the work 104 with a given spot diameter. On the other hand, the work 104 as a processing object is fixed on the table 105, enabling a desired processing against the work 104 by controlling the X-direction and Y-direction driving devices with a control device (not shown) in response to on processing pattern data.

The laser source is controlled so that the repeating frequency, pulse width and laser power of the laser emitted from the laser source may be changed depending on the traveling velocity of the light projection end of the optical fiber 102, even within the accelerating travel region where it starts to travel or within the decelerating travel region where it stops. The control means described above allows the irradiation energy density per unit time and unit area of the laser beam irradiating on the processing surface of the work 104 to be constant throughout the processing surface even in the accelerating travel region and decelerating travel region, enabling a uniform processing with a high dimensional accuracy. Moreover, the processing time is not prolonged because the irradiation energy density is made uniform even when the traveling velocity of the laser beam is changing as in the accelerating travel region to enable a uniform processing with a high dimensional accuracy in the travel region described above.

Although the light projection end of the optical fiber for guiding the laser beam from the laser source is allowed to travel while the laser source is fixed in the construction shown in FIG. 10, the light source may be allowed to travel, alternatively.

Therefore, according to the present invention, the irradiation energy density per unit time and unit area of the energy beam for irradiating the processing surface of the processing object is made uniform throughout the processing surface, enabling a uniform processing with high dimensional accuracy. Also, since the irradiation energy density becomes uniform even when the relative traveling velocity between the processing object and energy beam is changing as at the travel starting time of the processing object or the energy beam, allowing a uniform processing with high dimensional accuracy even in such travel region, thereby making it possible to prevent a prolonged processing time.

Also, according to an another aspect of the present invention, the relative traveling velocity is adjusted to be proportional to the energy density per unit time and unit area of the energy beam on the processing object, by adjusting (1) the relative traveling velocity to be proportional to (1) the frequency, (2) pulse width and/or (3) irradiation power, of the pulse energy beam for repeatedly irradiating the processing object.

Also, according to still another aspect of the invention, the relative traveling velocity is made to be proportional to the repeating frequency of the energy beam for allowing the relative traveling velocity be adjusted to be proportional to the irradiation energy density per unit time and unit area of the energy beam on the processing object by (1) driving the energy beam irradiation device in response to the driving trigger generated from the trigger generation means with a frequency proportional to the relative traveling velocity and/or (2) adjusting the rotational velocity of the driving motor driving the mounting table for mounting the processing object, or the traveling velocity of the mounting table to be proportional to the repeating frequency of the energy beam.

According to another aspect of the invention, furthermore, the construction of the irradiation control means for controlling the energy beam irradiation device can be simplified, because the driving trigger can be generated with a frequency proportional to the traveling velocity of the processing object using the encoder generally used for controlling rotation of a driving motor, or using pulse signals transmitted from the linear scale generally used for positional detection of the mounting table for mounting the processing object.

Also, according to another aspect of the invention, the frequency range of the driving trigger can be set within a range suitable for the energy beam irradiation device by changing the driving trigger frequency for driving the energy beam irradiation device, and the energy density for irradiating the processing object can be changed.

Therefore, a uniform laser beam processing with a high dimensional accuracy is achieved without prolonging the processing time of the processing object according to the present invention.

Japanese Patent Application 10-056155 filed Feb. 19, 1998, Japanese Patent Application 10-325582 filed Nov. 16, 1998 and Japanese Patent Application 11-034871 filed Feb. 12, 1999 are hereby incorporated by references.

What is claimed is:

1. A processing method comprising:
   driving a processing object;

irradiating an energy beam, with an energy irradiation device, on a processing surface of the processing object generating, via a linear scale, pulse signals corresponding to travel positions along an X-direction or Y-direction of the processing object;

calculating a traveling velocity of the processing object based on the pulse signals generated by the linear scale and outputting pulse signals corresponding to the calculated traveling velocity of the processing object;

dividing the pulse signals output by the calculating step; and generating a driving trigger for driving the energy beam irradiation device in response to the pulse signals divided by the dividing step such that an irradiation energy density per unit time and unit area of the energy beam is proportional to the traveling velocity of the processing object, wherein the driving trigger is determined without using a conversion table or conversion equation.

2. A processing method according to claim 1, wherein the energy beam has an irradiation path which is fixed relative to traveling processing object.

3. A processing method according to claim 2, wherein the energy beam is a pulse, having a width for repeatedly irradiating the processing object.

4. A processing method according to claim 2, wherein the energy beam is a pulse for repeatedly irradiating the processing object with a given repeating frequency, and wherein a pulse width of the energy beam is proportional to the traveling velocity of the processing object.

5. A processing method according to claim 2, wherein an irradiation power of the energy beam is proportional to the traveling velocity of the processing object.

6. A processing method according to claim 2, wherein the energy beam is a laser beam.

7. A processing method according to claim 1, wherein the energy beam is a pulse having a width for repeatedly irradiating the processing object with a repeating frequency proportional to the relative traveling velocity.

8. A processing method according to claim 7, wherein the energy beam is a pulse for repeatedly irradiating the processing object with a given repeating frequency, and wherein a pulse width of the energy beam is proportional to the traveling velocity of the processing object.

9. A processing method according to claim 7, wherein an irradiation power of the energy beam is proportional to the traveling velocity of the processing object.

10. A processing method according to claim 7, wherein the energy beam is a laser beam.

11. A processing method according to claim 1, wherein the energy beam is a pulse for repeatedly irradiating the processing object with a given repeating frequency, and wherein a pulse width of the energy beam is proportional to the traveling velocity of the processing object.

12. A processing method according to claim 11, wherein an irradiation power of the energy beam is proportional to the traveling velocity of the processing object.

13. A processing method according to claim 11, wherein the energy beam is a laser beam.

14. A processing method according to claim 1, wherein an irradiation power of the energy beam is proportional to the traveling velocity of the processing object.

15. A processing method according to claim 1, wherein the energy beam is a laser beam.

16. A processing apparatus comprising:

processing object driving means for driving a processing object;

an energy beam irradiation device for irradiating an energy beam on a processing surface of the processing object driven by the processing object driving means;

a linear scale for generating pulse signals corresponding to travel positions along an X-direction or Y-direction of the processing object;

means for calculating a traveling velocity of the processing object based on the pulse signals generated by the linear scale and outputting pulse signals corresponding to the calculated traveling velocity of the processing object;

means for dividing the pulse signals output by the calculating means; and means for generating a driving trigger for driving the energy beam irradiation device in response to the pulse signals divided by the dividing means so an irradiation energy density per unit time and unit area of the energy beam on the processing object is proportional to the traveling velocity of the processing object, wherein the driving trigger is determined without using a conversion table or conversion equation.

17. A processing apparatus according to claim 16, wherein the energy beam irradiation device comprises a device for repeatedly irradiating a pulse energy beam having a given pulse width on the processing object, and wherein the energy beam irradiation device is controlled so a repeating frequence of the energy beam is proportional to the relative traveling velocity of the processing object.

18. A processing apparatus according to claim 17, further comprising a dividing circuit for dividing the synchronizing signal in the trigger generation means.

19. A processing apparatus according to claim 17, wherein the energy beam is a laser beam.

20. A processing apparatus according to claim 16, wherein the energy beam irradiation device comprises irradiation means for repeatedly irradiating the energy beam on the processing object at a repeating frequency, and wherein the energy beam irradiation device is controlled so a pulse width of the energy beam is proportional to the relative traveling velocity of the processing object.

21. A processing apparatus according to claim 16, wherein an output of the energy beam irradiation device is controlled so an irradiation power of the energy beam is proportional to the relative traveling velocity of the processing object.

22. A processing apparatus according to claim 16, wherein the energy beam is a laser beam.

23. A processing apparatus comprising:

a driving system including a driving motor and configured to drive a processing object;

an energy beam irradiation device configured to irradiate an energy beam on a processing surface of the processing object driven by the driving system;

a linear scale configured to generate pulse signals corresponding to travel positions along an X-direction or Y-direction of the processing object;

an arithmetic circuit configured to calculate a traveling velocity of the processing object based on the pulse signals generated by the linear scale, and configured to output pulse signals corresponding to the calculated traveling velocity of the processing object;

a dividing circuit configured to divide the pulse signals output by the arithmetic circuit; and a trigger generation circuit configured to generate a driving trigger for driving the energy beam irradiation device in response to the pulse signals divided by the dividing circuit so an irradiation energy density per unit time and unit area of the energy beam on the processing object is proportional to the traveling velocity of the processing object, wherein the driving trigger is determined without using a conversion table or conversion equation.

24. A processing apparatus according to claim 23, wherein the energy beam irradiation device repeatedly irradiates a pulse energy beam having a given pulse width on the processing object, and wherein the energy beam irradiation device is controlled so a repeating frequence of the energy beam is proportional to the relative traveling velocity of the processing object.

25. A processing apparatus according to claim 23, wherein the energy beam is a laser beam.

26. A processing apparatus according to claim 23, wherein the energy beam irradiation device repeatedly irradiates the energy beam on the processing object at a repeating frequency, and wherein the energy beam irradiation device is controlled so a pulse width of the energy beam is proportional to the relative traveling velocity of the processing object.

27. A processing apparatus according to claim 23, wherein an output of the energy beam irradiation device is controlled so an irradiation power of the energy beam is proportional to the relative traveling velocity of the processing object.

* * * * *

UNITED STATES PATENT AND TRADEMARK OFFICE
CERTIFICATE OF CORRECTION

PATENT NO.    : 6,346,687 B1
DATED         : February 12, 2002
INVENTOR(S)   : Makoto Kinoshita et al.

It is certified that error appears in the above-identified patent and that said Letters Patent is hereby corrected as shown below:

Column 10,
Line 39, "1a" should be -- 18 --.

Column 11,
Line 60, "16" should be -- 18 --.

Column 12,
Line 13, "23z" should be -- 23x --.
Line 60, delete "a".

Signed and Sealed this

Twelfth Day of November, 2002

*Attest:*

JAMES E. ROGAN
*Attesting Officer*  *Director of the United States Patent and Trademark Office*